UNITED STATES PATENT OFFICE.

GUSTAV HACKEL, OF VIENNA, AUSTRIA-HUNGARY, ASSIGNOR TO CARL KASTNER, OF SAME PLACE.

MATCH-PASTE COMPOSITION.

SPECIFICATION forming part of Letters Patent No. 625,299, dated May 16, 1899.

Application filed October 21, 1898. Serial No. 694,216. (No specimens.)

*To all whom it may concern:*

Be it known that I, GUSTAV HACKEL, merchant, a subject of the Emperor of Austria-Hungary, residing at Vienna, in the Empire of Austria-Hungary, have invented certain new and useful Improvements in or Relating to Matches, of which the following is a specification.

This invention relates to novel matches which are non-poisonous and free from white or yellow phosphorus and which may be ignited upon any rubbing-surface and to an igniting substance for the manufacture of the same, which matches are not affected by moisture in the air, nor are they capable of igniting by rubbing one against the other, and are therefore very readily transportable. The igniting substance consists, mainly, of bichromate of potash, gum-arabic, amorphous phosphorus, and chlorate of potassium, to which mixture is added any suitable mineral color or kermes and hyposulfite of lead, or in place of this either oxide of copper alone or mixed with sulphur, together with the necessary quantity of water.

An advantageous proportion for the mixture of the igniting paste is as given below by way of example: 4.23 parts, by weight, of bichromate of potash, (red;) 13.23 parts, by weight, of an aqueous solution of gum-arabic, (1:2;) 3.17 parts, by weight, of amorphous phosphorus; 21.16 parts, by weight, of hyposulfite of lead; 10.58 parts, by weight, of mineral coloring or kermes; 15.88 parts, by weight, of water, and 31.75 parts, by weight, of chlorate of potassium, in which, as already stated, the hyposulfite of lead may be replaced either by oxide of copper alone or in combination with sulphur.

The following process for the manufacture of the igniting substance may advantageously be employed: The bichromate of potash, the amorphous phosphorus, the hyposulfite of lead, and the mineral coloring and water are formed into a paste with the solution of gum-arabic and thoroughly mixed while in a wet state. When it has been intimately mixed, there is added to this pasty and still thoroughly-wet mass the chlorate of potassium, the whole being mixed in a moist condition until the mixture becomes homogeneous. The sticks, which have previously been paraffined, are impregnated with this impregnating substance and then dried.

What I claim is—

A match-paste consisting of bichromate of potash, gum-arabic, amorphous phosphorus, chlorate of potassium, a mineral coloring-matter, hyposulfite of lead, and water substantially in the proportions specified.

In testimony whereof I have hereunto set my hand, in presence of two subscribing witnesses, this 7th day of October, 1898.

GUSTAV HACKEL.

Witnesses:
 ALVESTO S. HOGUE,
 ADOLF GROOBODA.